(12) United States Patent
Gennett et al.

(10) Patent No.: US 10,367,222 B2
(45) Date of Patent: Jul. 30, 2019

(54) MATERIALS FOR FLOW BATTERY ENERGY STORAGE AND METHODS OF USING

(71) Applicant: Alliance for Sustainable Energy, LLC, Golden, CO (US)

(72) Inventors: Thomas Gennett, Denver, CO (US); Chunmei Ban, Golden, CO (US); Wade A. Braunecker, Lafayette, CO (US); Arrelaine A. Dameron, Boulder, CO (US); Chaiwat Engtrakul, Louisville, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 163 days.

(21) Appl. No.: 15/445,105

(22) Filed: Feb. 28, 2017

(65) Prior Publication Data

US 2017/0250434 A1    Aug. 31, 2017

Related U.S. Application Data

(60) Provisional application No. 62/300,964, filed on Feb. 29, 2016.

(51) Int. Cl.
*H01M 8/00* (2016.01)
*H01M 8/18* (2006.01)
(Continued)

(52) U.S. Cl.
CPC ......... *H01M 8/188* (2013.01); *H01M 4/364* (2013.01); *H01M 4/505* (2013.01); *H01M 4/525* (2013.01); *H01M 4/5825* (2013.01); *Y02E 60/528* (2013.01)

(58) Field of Classification Search
CPC ...... H01M 4/364; H01M 4/505; H01M 4/525; H01M 8/188
See application file for complete search history.

(56) References Cited

U.S. PATENT DOCUMENTS 7,226,697 B2    6/2007  Nakahara et al.
8,530,086 B2    9/2013  Hojo et al.
(Continued)

FOREIGN PATENT DOCUMENTS

WO    WO 2014/093876 A1    6/2014
WO    WO 2014/150210 A1    9/2014

OTHER PUBLICATIONS

Bitsch, B. et al., "A novel slurry concept for the fabrication of lithium-ion battery electrodes with beneficial properties," Journal of Power Sources, vol. 265, 2014, pp. 81-90.
(Continued)

*Primary Examiner* — Cynthia H Kelly
*Assistant Examiner* — Monique M Wills
(74) *Attorney, Agent, or Firm* — Michael A. McIntyre

(57) ABSTRACT

The present disclosure relates to a mixture that includes a mediator having a first redox potential, a non-liquid active material having a second redox potential that is less than the first redox potential, and a cation. In addition, the non-liquid active material has a first condition that includes a first oxidation state, where the cation is intercalated within the non-liquid active material, and the non-liquid active material has a second condition that includes a second oxidation state that is higher than the first oxidation state, where the non-liquid active material is substantially free of the cation. In addition, the mediator has a first condition that includes a third oxidation state and a second condition that includes a fourth oxidation state that is higher than the third oxidation state. In addition, the non-liquid active material is capable of being reversibly cycled between its first condition and its
(Continued)

second condition, and the mediator is capable of being reversibly cycled between its first condition and its second condition.

21 Claims, 8 Drawing Sheets

(51) Int. Cl.
    *H01M 4/36*     (2006.01)
    *H01M 4/505*     (2010.01)
    *H01M 4/525*     (2010.01)
    *H01M 4/58*     (2010.01)

(56) References Cited

U.S. PATENT DOCUMENTS

| | | |
|---|---|---|
| 8,722,227 B2 | 5/2014 | Chiang et al. |
| 9,153,833 B2 | 10/2015 | Chiang et al. |
| 2010/0143805 A1 | 6/2010 | Hintermann et al. |
| 2013/0224538 A1 | 8/2013 | Sen et al. |
| 2013/0266836 A1 | 10/2013 | Wang et al. |
| 2013/0273459 A1 | 10/2013 | Xu et al. |
| 2014/0023940 A1* | 1/2014 | Zaghib ............... H01M 4/134 429/405 |
| 2014/0141291 A1 | 5/2014 | Wang et al. |
| 2014/0212753 A1 | 7/2014 | Huang et al. |
| 2015/0207165 A1 | 7/2015 | Schubert et al. |
| 2015/0263371 A1* | 9/2015 | Stahl ............... H01M 8/188 429/498 |
| 2015/0333551 A1 | 11/2015 | Aronov et al. |

OTHER PUBLICATIONS

Doeff, M., "Battery Cathodes," Chapter 2, Encyclopedia of Sustainability Science and Technology, DOI:10.1007/978-1-4419-0851-3, 46 pages.

Guo, W. et al., "Superior radical polymer cathode material with a two-electron process redox reaction promoted by graphene," Energy & Environmental Science, vol. 5, 2012, pp. 5221-5225.

Huang, J. et al., "Liquid Catholyte Molecules for Nonaqueous Redox Flow Batteries," Advanced Energy Materials, vol. 5, 2015, 6 pages.

Huang, Q. et al., "Composite organic radical-inorganic hybrid cathode for lithium-ion batteries," Journal of Power Sources, vol. 233, 2013, pp. 69-73.

Huang, Q. et al., "Reversible chemical delithiation/lithiation of $LiFePO_4$: towards a redox flow lithium-ion battery," Phys. Chem. Chem. Phys., vol. 15, 2013, pp. 1793-1797.

Janoschka, T. et al., "An aqueous, polymer-based redox-flow battery using non-corrosive, safe, and low-cost materials," Nature, vol. 527, Issue 7576, Nov. 5, 2015, pp. 78-81.

Jia, C. et al., "High-energy density nonaqueous all redox flow lithium battery enabled with a polymeric membrane," Science Advances; vol. 1, No. 10, Nov. 27, 2015, pp. 1-7.

Nakahara, K. et al., "Rechargeable batteries with organic radical cathodes," Chemical Physics Letters, vol. 359, 2002, pp. 351-354.

Nishide, H. et al., "Organic radical battery: nitroxide polymers as a cathode-active material," Electrochimica Acta, vol. 50, 2004, pp. 827-831.

Nishide, H. et al., "Organic Radical Battery," The Electrochemical Society *Interface*, Winter 2005, pp. 32-36.

Presser, V. et al., "The Electrochemical Flow Capacitor: A New Concept for Rapid Energy Storage and Recovery," Advanced Energy Materials, vol. 2, Issue 7, Jul. 2012, pp. 895-902.

Reddy, A. et al., "Hybrid Nanostructures for Energy Storage Applications," Advanced Materials, vol. 24, Issue 37, Sep. 25, 2012, pp. 1-20.

Sukegawa, T. et al., "Synthesis of Pendant Nitronyl Nitroxide Radical-Containing Poly(norbornene)s as Ambipolar Electrode-Active Materials," Macromolecules, vol. 46, No. 4, 2013, pp. 1361-1367.

Vlad, A. et al., "Hybrid supercapacitor-battery materials for fast electrochemical charge storage," Scientific Reports, vol. 4:4315, Mar. 7, 2014, pp. 1-7.

Wei, X. et al., "Tempo-Based Catholyte for High-Energy Density Nonaqueous Redox Flow Batteries," Advanced Materials, vol. 26, Issue 45, 2014, pp. 7649-7653.

Search Report from corresponding PCT patent application No. PCT/US17/19992 dated Jun. 28, 2017, 4 pages.

Written Opinion from corresponding PCT patent application No. PCT/US17/19992 dated Jun. 28, 2017, 6 pages.

\* cited by examiner

1)

2)

MATERIALS FOR FLOW BATTERY ENERGY STORAGE AND METHODS OF USING

CROSS-REFERENCE TO RELATED APPLICATIONS

This application claims priority to U.S. Provisional Application No. 62/300,964 filed Feb. 29, 2016, the contents of which are incorporated herein by reference in its entirety.

CONTRACTUAL ORIGIN

The United States Government has rights in this disclosure under Contract No. DE-AC36-08GO28308 between the United States Department of Energy and the Alliance for Sustainable Energy, LLC, the Manager and Operator of the National Renewable Energy Laboratory.

BACKGROUND

Redox flow battery technology is promising for large-scale, grid energy storage because of several attractive features including long calendar life, simple design, wide operating temperature ranges, and a capability to withstand fluctuating power supply. A redox flow battery stores its energy in the form of redox-active materials dissolved/suspended in liquid electrolytes circulating between external reservoirs and electrochemical cells. This decoupling of energy and power offers excellent scalability as compared to traditional static batteries and gives flow batteries a significant advantage for grid applications.

An example of a flow battery system is the vanadium redox flow battery, an aqueous system that relies upon reduction and oxidation of soluble vanadates. Even though this technology has seen good cycle life (>10,000 cycles) and calendar life (10-20 years), it is not widely implemented for grid energy storage. This is attributed to the drawbacks of this technology, which includes limited energy density (~25 Wh/L due to the low cell voltage <1.8 V) and slow charge transfer kinetics. Low energy densities are a common deficiency present in current flow battery systems with energy densities typically falling below about 10 Wh/L. Thus, there is clearly a need for new solutions that improve the voltage, volumetric capacity, energy density, kinetics, and/or lifetime of redox flow batteries and systems.

SUMMARY

An aspect of the present disclosure is a mixture that includes a mediator having a first redox potential, a non-liquid active material having a second redox potential that is less than the first redox potential, and a cation. In addition, the non-liquid active material has a first condition that includes a first oxidation state, where the cation is intercalated within the non-liquid active material, and the non-liquid active material has a second condition that includes a second oxidation state that is higher than the first oxidation state, where the non-liquid active material is substantially free of the cation. In addition, the mediator has a first condition that includes a third oxidation state and a second condition that includes a fourth oxidation state that is higher than the third oxidation state. In addition, the non-liquid active material is capable of being reversibly cycled between its first condition and its second condition, and the mediator is capable of being reversibly cycled between its first condition and its second condition. In some embodiments of the present disclosure, the mediator may include an organic radical group. In some embodiments of the present disclosure, the organic radical group may include a nitroxide group. In some embodiments of the present disclosure, the mediator may have a molecular weight less than about 10,000 g/mol. In some embodiments of the present disclosure, the mediator may include at least one of (2,2,6,6-tetramethylpiperidin-1-yl)oxyl, (1-oxyl-2,2,6,6-tetramethyl-4-hydroxypiperidine), a nitronyl nitroxide, a azephenylenyl, a percholorophenylmethyl radical, tris(2,4,6-trichlorophenyl)methyl radical, poly(2,2,6,6-tetramethylpiperidinyloxy-4-yl methacrylate), and/or poly[4-(nitronylnitroxyl)styrene].

In some embodiments of the present disclosure, when in the first condition of the mediator, the mediator may include

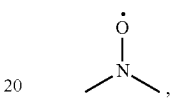

and when in the second condition of the mediator, the mediator may include

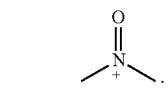

In some embodiments of the present disclosure, the mediator may include a structure that includes at least one of

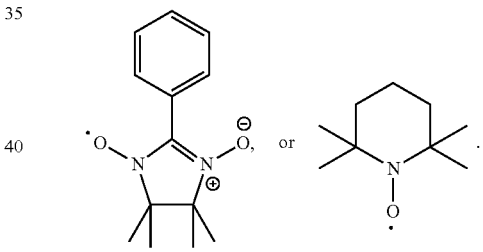

In some embodiments of the present disclosure, the non-liquid active material may include at least one of a solid and/or a gel. In some embodiments of the present disclosure, the non-liquid active material may include a solid particulate. In some embodiments of the present disclosure, the solid particulate may have a particle size between 1 nanometer and 1000 micrometers. In some embodiments of the present disclosure, the non-liquid active material may include at least one of cobalt, nickel, manganese, aluminum, titanium, vanadium, and/or iron. In some embodiments of the present disclosure, the non-liquid active material may include at least one of an oxide and/or a phosphate. In some embodiments of the present disclosure, the non-liquid active material may include at least one of a cobalt oxide, a nickel cobalt oxide, a manganese cobalt oxide, and/or an iron phosphate. In some embodiments of the present disclosure, the non-liquid active material may include at least one of $CoO_2$, $FePO_4$, and/or $Fe_{0.5}Mn_{0.5}PO_4$.

In some embodiments of the present disclosure, the cation may include at least one of a Group 1, a Group 2, and/or a Group 13 element. In some embodiments of the present disclosure, the cation may include at least one of lithium, magnesium, aluminum, and/or beryllium. In some embodiments of the present disclosure, the mixture may further include a salt, where the salt provides at least a portion of the cation. In some embodiments of the present disclosure, the salt may include at least one of $LiPF_6$, $LiBF_4$, and/or $LiClO_4$. In some embodiments of the present disclosure, the mixture may further include a solvent, where the mediator and the salt are substantially soluble in the solvent. In some embodiments of the present disclosure, the mixture may have an energy storage density greater than or equal to 300 Wh/L, when the non-liquid active material is in its second condition, and the mediator is in its second condition.

An aspect of the present disclosure is a method that includes transferring energy to a mixture by applying a voltage to the mixture, where the mixture includes a mediator, an active material, and a salt mixed within a solvent, the voltage transforms the mediator from a neutral condition to an oxidized condition, and the mediator in the oxidized condition oxidizes the active material, thereby transforming the active material from a low energy condition to a high energy condition, and regenerating the mediator to its neutral condition. In some embodiments of the present disclosure, the method may further include applying a load to the mixture, wherein the load transforms the active material from its high energy condition to its low energy condition.

An aspect of the present disclosure is a system that includes a first flow battery positioned on a vehicle and a second flow battery positioned external of the vehicle, where the first flow battery is only operated in a charging mode, and the second flow battery is only operated in a discharging mode. In some embodiments of the present disclosure, the first flow battery may include a solid active cathode material. In some embodiments of the present disclosure, the first flow battery and the second flow battery may exchange a cathode mixture that includes an electrolyte and a mediator. In some embodiments of the present disclosure, the first flow battery and the second flow battery may exchange an anode mixture that includes an electrolyte and a solid active anode material such that the anode mixture is a slurry.

REFERENCE NUMBERS

Figure 1:
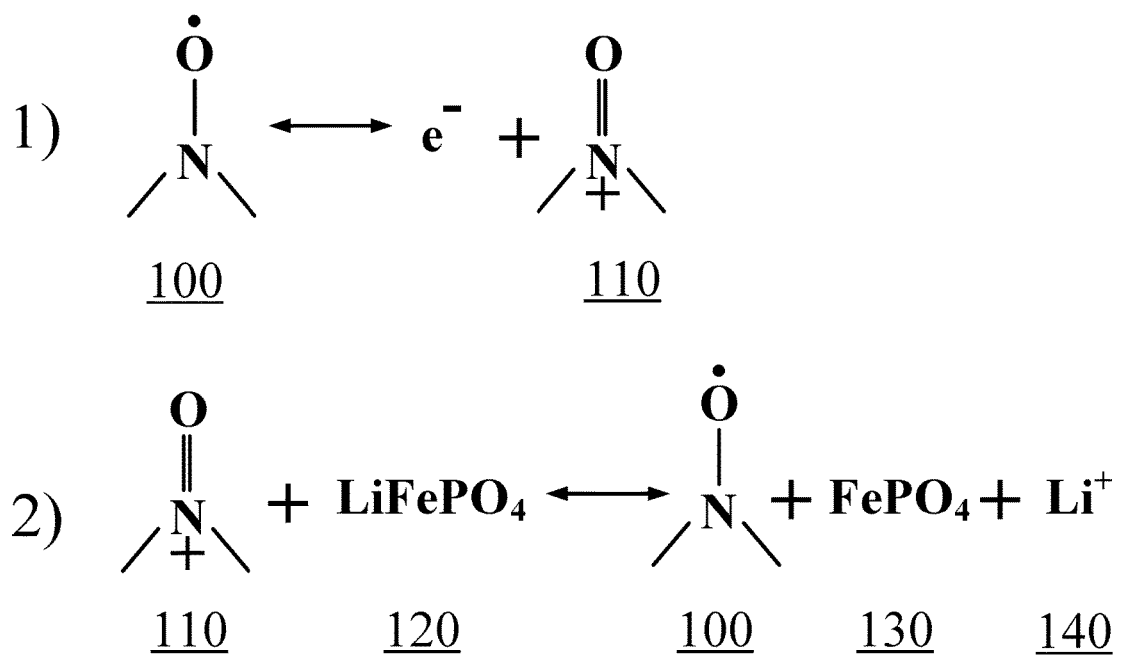
FIG. 1 illustrates cathode charging half-reactions, according to some embodiments of the present disclosure.

100 . . . neutral mediator
110 . . . oxidized mediator
120 . . . reduced active cathode material
130 . . . oxidized active cathode material
140 . . . cation
300 . . . energy storage system
305 . . . catholyte reservoir
310 . . . catholyte
315 . . . anolyte reservoir
320 . . . anolyte
325 . . . electrochemical cell
330 . . . separator
335 . . . first half-cell
340 . . . second half-cell
345 . . . first current collector
350 . . . second current collector
355 . . . electrical circuit
360 . . . catholyte pump
365 . . . first catholyte supply line
370 . . . second catholyte supply line
375 . . . catholyte return line
380 . . . anolyte pump
385 . . . first anolyte supply line
390 . . . second anolyte supply line
395 . . . anolyte return line
400 . . . catholyte loop
410 . . . reactor
500 . . . energy storage system
510 . . . liquid mediator
515 . . . mediator reservoir
520 . . . solid active cathode material
530 . . . anode
540 . . . discharge circuit
550 . . . charge circuit
560 . . . supply line
570 . . . return line

DETAILED DESCRIPTION

The present disclosure describes hybrid materials, e.g. matrices, for catholyte mixtures that are suitable for large-scale energy storage flow and/or flow-like batteries, and methods and systems utilizing such catholyte mixtures. The catholyte mixtures described herein have demonstrated improved upper voltage limits, faster kinetics, and higher solution concentrations, resulting in, among other things, energy densities up to an order of magnitude greater than existing catholyte mixtures for flow battery systems. In some embodiments of the present disclosure, energy densities exceed those of current technologies by factors greater than 10 because of their improved voltage levels.

A "catholyte" typically refers to a mixture that includes a cathode material and other additives mixed with an electrolyte. For redox flow battery systems, an "electrolyte" is typically a salt dissolved in a liquid, where the salt provides the ions necessary for the battery's redox reactions to occur. The present disclosure describes catholyte mixtures that include an active cathode material and a mediator. In some embodiments of the present disclosure, a catholyte mixture may include an active cathode material, a mediator, and an electrolyte. In some embodiments of the present disclosure, a catholyte mixture may include an active cathode material, a mediator, an electrolyte, and at least one additive. The active cathode material may be in the liquid phase and/or in a non-liquid phase, and may include at least one of a solid, a gel, a dissolved solution, and/or a suspension. In addition, the mediator must have a redox potential, $E°_m$, that is equal to or more positive than the redox potential, $E°_a$, of the active cathode material. Thus, the mediator may define the charge/discharge rates of a flow battery using a catholyte mixture that includes the mediator and an active cathode material, while also limiting the over-potential limits of the active cathode material due to the more positive working voltage of the mediator. This may provide faster "homogeneous or heterogeneous chemical" charging of the cathode and limit over voltage of the active cathode material. The mediator may be in the liquid phase and/or in a non-liquid phase, such as a solid and/or gel, and/or a slurry. The mediator may be dissolved in a solution and/or suspended in a solution. In some embodiments of the present disclosure, the mediator may be a surface modifier of the active cathode material, e.g. resulting in core-shell-like structures as described below.

FIG. 1 illustrates an example of cathode half-reactions that may occur during the charging of a flow cell battery, according to some embodiments of the present disclosure. In this example, as shown in Reaction 1), a neutral mediator 100 having a nitroxide functional group, reversibly transitions from a neutral state to an oxidized state. For this example of a mediator, when in the neutral state, the nitroxide functional group of the neutral mediator 100 is in the form of a stable, neutral radical. In the oxidized state, the nitroxide functional group of the oxidized mediator 110 is in the form of a non-radical, positively-charged ion. During charging (e.g. application of a voltage to the redox flow battery) the neutral mediator 100 contained in the catholyte mixture is oxidized, converting it to the oxidized mediator 110. In some embodiments of the present disclosure, charging converts the neutral mediator 100 from a low energy state corresponding to the neutral state, to the oxidized mediator 110 at a higher energy, oxidized state.

Referring to Reaction 2) of FIG. 1, the oxidized mediator 110 "mediates" oxidation of the active cathode material 120, such that the oxidized mediator 110 is reduced, resulting in the regeneration of the neutral mediator 100. In this example, the active cathode material (120 and 130) includes iron phosphate, either intercalated with lithium to form the reduce active cathode material 120, or substantially free of intercalated lithium to form the oxidized active cathode material 130. Like the mediator (100 and 110), the active cathode material (120 and 130) has two states, a reduced state and an oxidized state. In some embodiments of the present disclosure, the reduced active cathode material 120 corresponds to a low energy state, while the oxidized active cathode material 130 corresponds to a high energy state. For this example, the low energy state corresponds to the reduced active cathode material 120, where iron phosphate having iron in the 2+ oxidation state is intercalated with lithium cations (the combination referred to a lithium iron phosphate). Conversely, the high energy state corresponds to the oxidized active cathode material 130, where the iron phosphate is substantially free of intercalated lithium ions and the iron is in the 3+ oxidation state. Thus, the oxidized mediator 110 oxidizes (e.g. mediates) the reduced active cathode material 120, through a heterogeneous and/or homogeneous charge transfer reaction resulting in the conversion of the oxidized mediator 110 back to its original state, the neutral mediator 100. Substantially simultaneously, oxidation of the reduced active cathode material 120 transforms this species to the substantially lithium-free oxidized active cathode material 130, producing free lithium cations 140, which are released into the catholyte mixture (not shown).

The reactions illustrated in FIG. 1 demonstrate that the mediator (100 and 110) acts as an electron and/or energy transfer mediator. Charging the flow battery (e.g. by the application of an appropriate voltage to the flow battery between the flow battery's two electrodes) rapidly oxidizes the neutral mediator 100 to produce the oxidized mediator 110. Thus, Reaction 1) of FIG. 1 increases, at least temporarily, the stored energy density of the catholyte mixture during charging. However, the final energy density attainable may be substantially increased by Reaction 2) of FIG. 1, by the transfer of the energy stored in the oxidized mediator 110 to the reduced active cathode material 120 converting it to the oxidized active cathode material 130, as described above. Thus, in some embodiments, the active cathode material (120 and 130) is substantially the final energy storage destination and significantly increases the total energy density of the charged catholyte mixture, above the energy storage density of the mediator (100 and 110) alone. In addition, the transfer of energy from the oxidized mediator 110 to the reduced active cathode material 120 results in the regeneration of the neutral mediator 100 to its original uncharged, low energy state, thus making it available for further charging. Thus, the mediator (100 and 110) may function predominantly as an energy and/or charge transfer mediator, as well as a temporary energy storage medium until the primary energy storage medium, the active cathode material (120 and 130), receives the energy and/or charge from the mediator (120 and 130). However, the mediator (120 and 130) may also include the secondary role of an energy storage material, storing some additional charge/energy above the energy/charge stored by the active cathode material (120 and 130) alone.

Figure 2:
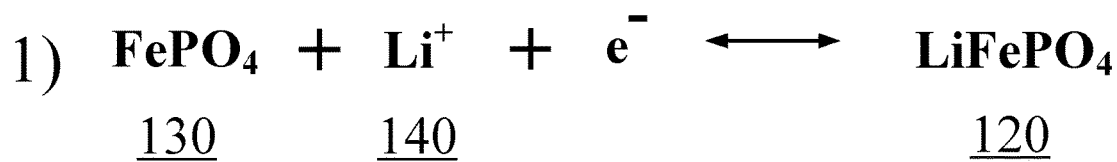
FIG. 2 illustrates cathode discharging half-reactions, according to some embodiments of the present disclosure.
Figure 2:
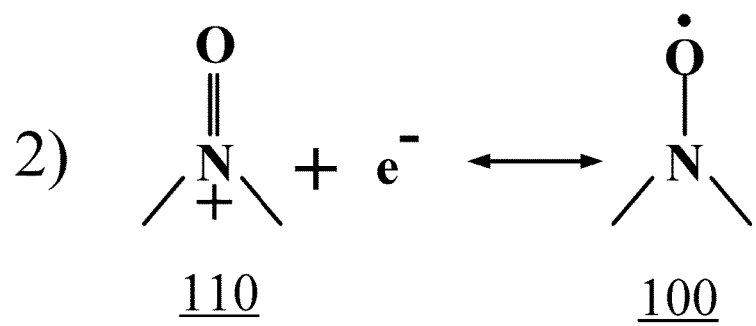

FIG. 2 illustrates cathode half-reactions that may occur during discharge of a flow battery, according to some embodiments of the present disclosure. Discharge may occur when a load is applied to the flow battery. Referring to Reaction 1) of FIG. 2, during discharge of the flow battery, the oxidized active cathode material 130 is reduced (e.g. in the cathode half-cell of the battery), resulting in the regeneration of the low energy, intercalated reduced active cathode material 120. Thus, application of a load to the battery system results in the transfer of "free" cations 140 (e.g. lithium cations) from the catholyte mixture into the iron phosphate solid of the oxidized active cathode material 130, resulting in the regeneration of $FePO_4$ having intercalated lithium (the reduced active cathode material 120). In addition, referring to Reaction 2) of FIG. 2, application of a load to the flow battery may also result in the reduction of any remaining oxidized mediator 110 to regenerate the neutral mediator 100.

As described above, catholyte mixtures described herein may include at least one of a solvent, a mediator, a non-liquid active cathode material, and/or a cation-containing salt. The solvent (or solvent mixture) used may provide a solubility sufficient to dissolve most or all of the mediator, the active cathode material, and/or the cation-containing salt. In other cases, at least one solvent may be selected where the solvent has a low solubility for one or more of the components of the catholyte mixture, so that the components remain in a second phase, resulting in a heterogeneous mixture such as a solid-liquid slurry. It is often desirable to select a solvent that will not degrade during the charging/discharging of the flow battery, for example due to the system operating conditions (e.g. temperatures and/or voltages). However, in general, suitable solvents may include at least one of an aqueous solvent, a non-aqueous solvent, a protic solvent and/or an aprotic solvent. Examples of aprotic solvents that may be used in catholyte mixtures described herein include carbonates, ethers, acetates, and/or ketones. Further examples of aprotic solvents include tetrahydrofuran, ethyl acetate, acetone, dimethylformamide, acetonitrile, dimethyl sulfoxide, and/or propylene carbonate. Examples of protic solvents that may be used in catholyte mixtures described herein include water, alcohols, and/or glycerin. Examples of suitable alcohols include methanol, ethanol, propanol, butanol, and/or other alcohols with molecular weights larger than butanol. Suitable alcohols include both straight-chained and branched alcohols.

In some embodiments of the present disclosure, at least one mediator is dissolved or substantially dissolved within at least one solvent to form a catholyte mixture. In some embodiments of the present disclosure, at least one mediator remains substantially undissolved in at least one solvent, for example in the form of a solid and/or second insoluble liquid. A mediator may contain at least one functional group that may be reversibly oxidized and reduced such as a nitroxide functional group (e.g. $R_2NO$). In some embodiments of the present disclosure, a mediator may be a nitroxide-containing mediator. In some embodiments of the present disclosure, a mediator may include at least one of TEMPO ((2,2,6,6-tetramethylpiperidin-1-yl)oxyl or (2,2,6,6-tetramethylpiperidin-1-yl)oxidanyl), TEMPOL (1-oxyl-2,2,6,6-tetramethyl-4-hydroxypiperidine), nitronyl nitroxides, azephenylenyls, radicals derived from PTM (percholorophenylmethyl radical), and/or TTM (tris(2,4,6-trichlorophenyl) methyl radical). A mediator may include at least one of poly(2,2,6,6-tetramethylpiperidinyloxy-4-yl methacrylate) (PTMA), poly[4-(nitronylnitroxyl)styrene] (PNNS and/or PNNS-c), and/or TEMPO. Other examples of mediators include stable and/or persistent radicals such as nitric oxide, thiazyl radicals, and/or triphenylmethyl radical. In some embodiments of the present disclosure, mediators may include at least one of the following chemical structures:

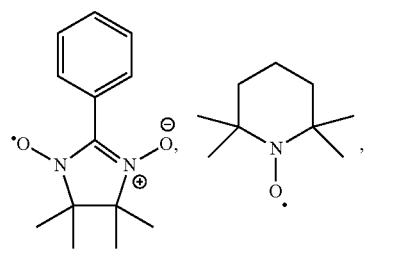

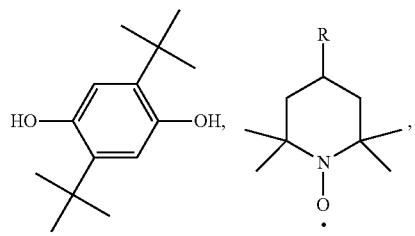

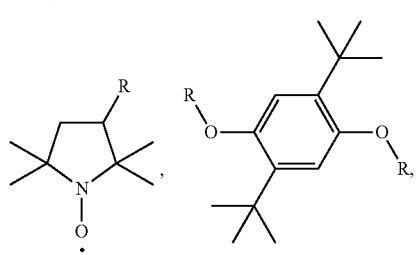

-continued

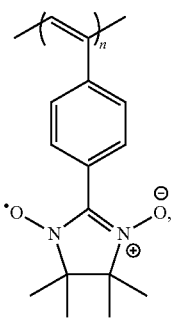

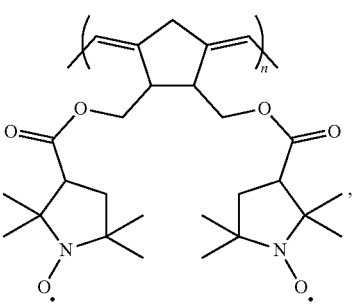

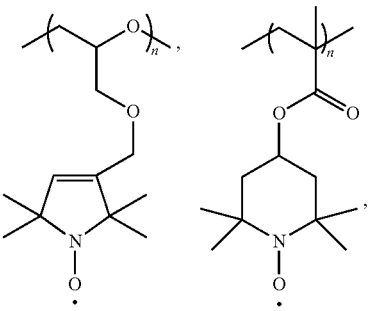

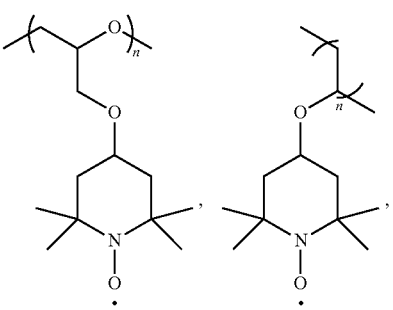

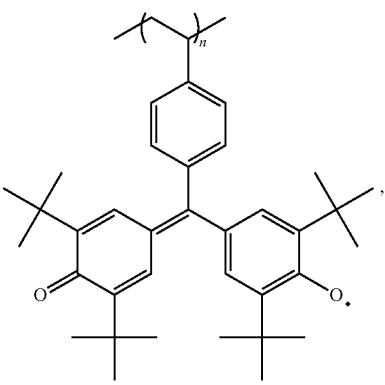

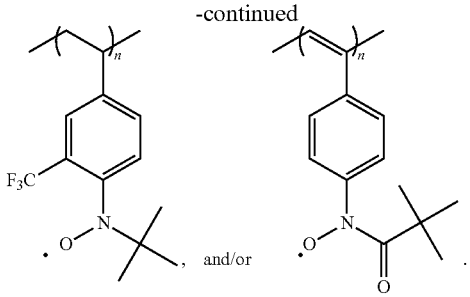, and/or

In some embodiments of the present disclosure, quinones may be used as mediators in a catholyte mixture, where the quinones may be reversibly cycled between a high energy oxidized state and a low energy reduced state. Examples of quinones include,

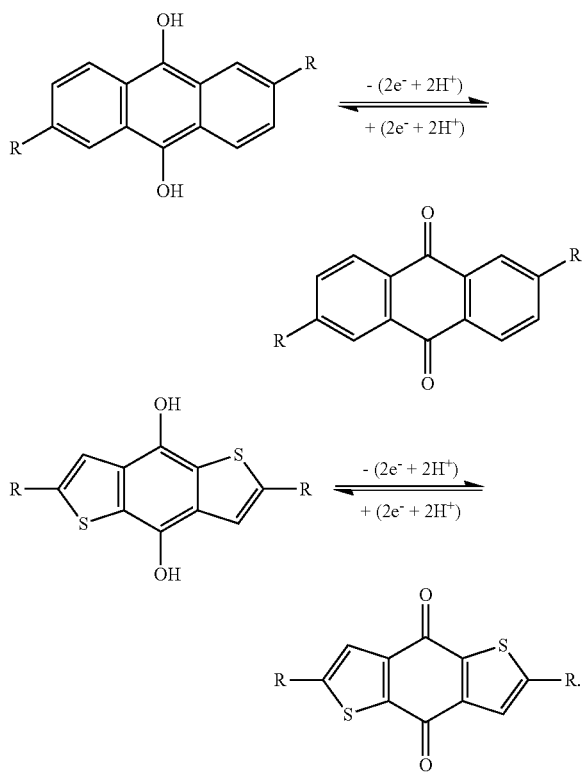

In some embodiments of the present disclosure 2,5-di-tert-butyl-1,4-bis(2-methoxyethoxy)benzene (DBBB) may be used as a mediator in a catholyte mixture, where the DBB may be reversibly cycled between a higher energy oxidized state and a low energy reduced state, according to,

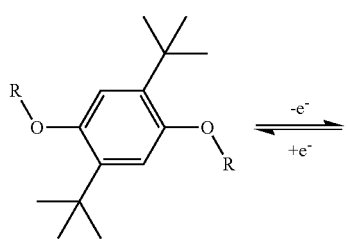

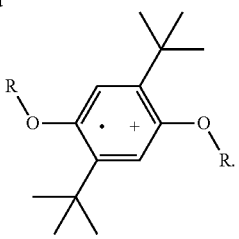

Thus, mediators may include one or more small molecules (e.g. monomers) and/or one or more polymeric molecules. In some examples, a mediator may have a molecular weight of less than about 10,000 g/mol, or less than about 1,000 g/mol. In some examples, a mediator may have a molecular weight of larger than about 1,000 g/mol, or larger than about 10,000 g/mol. The molecular weight of a mediator selected for a specific application will depend on the operating conditions of the application (e.g. temperature, voltages, etc.) and other design criteria (e.g. desired solubility of the mediator within the solvent selected, or choice of cell separator etc.). In the case of polymers, the term "molecular weight" refers to the number average molecular weight, defined as the total weight of the polymer divided by the number of molecules.

In some embodiments of the present disclosure, one or more of the mediators described above may be modified such that they are not soluble and/or only partially soluble within the electrolyte. This may be accomplished, for example, by increasing the molecular weight of the polymer backbone supporting the organic radical functional groups (e.g. increasing the length of the polymer chain and/or providing cross-linking). In some embodiments of the present disclosure, when a mediator is no longer soluble in the electrolyte, it may behave as an active cathode material as well as and/or instead of as a mediator.

Active cathode materials may be in liquid form and/or a non-liquid form. Non-liquid active cathode materials may include solids and/or gels. Examples of non-liquid active cathode materials include one or more oxides and/or phosphates, such as the oxides and/or phosphates of cobalt, nickel, manganese, aluminum, titanium, vanadium, and/or iron. Non-liquid active cathode materials may include at least one of a cobalt oxide, a nickel cobalt oxide, a manganese cobalt oxide, an iron phosphate, and/or a manganese iron phosphate. Non-liquid active cathode materials may include anionic matrices that enable the reversible intercalation of cationic counter-ions into the non-liquid matrices to balance the negative charge of the matrices. Cations that may reversibly intercalate into and out of active cathode material matrices include Group 1, Group 2, and/or Group 13 elements. Examples of such elements include lithium, magnesium, aluminum, and/or beryllium. Further, compounds that may be used as non-liquid active cathode materials in catholyte mixtures for flow battery systems include at least one of $LiCoO_2$, $LiFePO_4$ (with a voltage range of about 3.5 volts), and/or $LiFe_{0.5}Mn_{0.5}PO_4$. Another example of a non-liquid active cathode material is $LiMn_{2-x}M_xO_4$ where $x \geq 0.5$ (voltage range of about 5 volts). Further examples of non-liquid active cathode materials include $LiNiO_2$, $LiCoO_2$, $LiCo_{1-x-y}Ni_xMn_yO_2$, $LiMnO_2$, and/or $Li_{1+y}Mn_{2-x}M_xO_4$ (voltage ranges of about 4 volts). Further examples of non-liquid active cathode materials include $Li_xMn_{1-y}M_yO_2$, and/or $Li[Li_xM_yMn_{1-x-y}]O_2$ (voltage ranges of about 3 volts to about 4 volts). Further examples of non-liquid active cathode materials include Mn spinels such as $Li_4Mn_5O_{12}$, $Li_xMnO_2$, and/or $Li_xV_yO_z$ (voltage ranges of about 3 volts). Further examples of non-liquid active cathode materials include sulfur and polysulfides (voltage ranges of about 2 volts) and $FeS_2$ (voltage range of about 1.5 volts).

Non-liquid active cathode materials may be provided in the form of solid particles. Active cathode materials in the form of solid particles may significantly increase the energy density of a catholyte mixture above that attainable by the mediator alone. However, as charging and/or discharging rates may be limited by the mass-transfer rates of the cations at the interface between the solid phase of the non-liquid active cathode material and its surrounding environment (e.g. a liquid solvent mixture) and/or by intra-solid mass-transfer of the cations (e.g. within the phosphate and/or oxide solid bulk matrix), it may be desirable to minimize the average particle size of active cathode material particles to reduce these potentially rate-limiting mass-transfer steps. Thus, an active cathode material in the form of solid particles may include solid particles that have a characteristic diameter of less than about 1000 micrometers, or less than about 100 micrometers, or less than about 10 micrometers, or less than about 1 micrometer, or less than about 100 nanometers, or less than about 10 nanometers. In some embodiments of the present disclosure, active cathode materials in the form of solid particles may include solid particles that have a characteristic diameter between about 2 nanometers and about 2 micrometers. Particles may be in any suitable shape; e.g. flakes, spheres, rods, whiskers, cylinders, pellets, irregular/non-geometric shapes, and/or any other suitable shape. Particles may be completely solid and/or contain at least some void space; e.g. particles may be hollow. In addition, particles may include one or more layers of different solid materials.

In some embodiments of the present disclosure, mediators may be present substantially in the liquid form, for example dissolved in a solvent or "neat" where the mediator itself is a liquid in the absence of a solvent. For example, a catholyte mixture may include a nitroxide-containing liquid polymer (the mediator) slurried together with $LiPF_6$ and/or $LiFePO_4$ (the active cathode material). However, mediators may also be provided in the solid phase and then dispersed within a solvent that has a very low solubility for the solid mediator. In addition, a solid mediator may be combined directly with a solid active cathode material to form a "core-shell" structured hybrid material and/or a core shell at least partially covered by an outside layer. For example, a composite solid particle may be formed by depositing an outside layer of a solid mediator on the outer surface of an internal core of active cathode material. In some embodiments of the present disclosure, a composite solid particle may be formed by depositing an outside layer of solid active cathode material on an internal core of mediator. Such composite particles may then be suspended in a catholyte mixture, including a solvent and/or a cation-providing salt. In some examples, a mediator layer may be coated onto an underlying active cathode material layer; e.g. $LiFePO_4$ may be nucleated, grown in, and/or grown on a nitroxide polymer.

In some embodiments of the present disclosure, nitroxide functional groups may be grafted onto the surface of an active cathode material, e.g. onto $LiFePO_4$ particles. In some embodiments of the present disclosure, the mediator may be dissolved in the electrolyte solution and then passed through channels of a solid active cathode material, and/or passed over one or more surfaces of the solid active cathode material resulting in the oxidation of the active cathode material, such that the resultant reduced mediator may be directed back to the active "charging" half of the cell, and then recycled again across the solid active cathode material. Thus, the circulating flow of a catholyte solution containing the mediator from the charging half-cell to the solid active cathode material may proceed until the active cathode material is fully charged, and/or some other process target is achieved, at which point a load may be applied to the cell and the process reversed to utilize the stored energy as needed. (See FIGS. 5-8 for details and experimental results of such an embodiment.)

Figure 3:
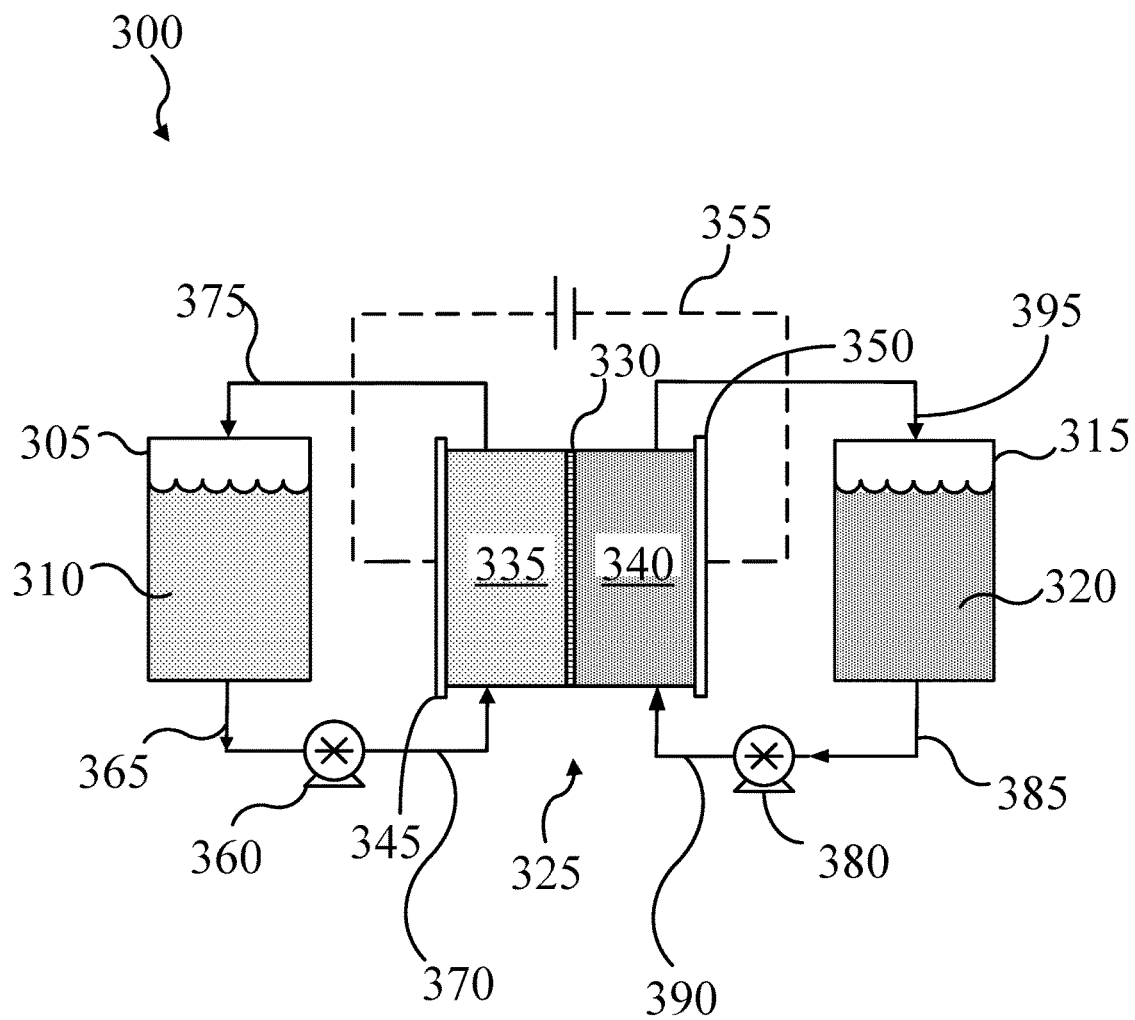
FIG. 3 illustrates a redox flow battery system (energy storage system), according to some embodiments of the present disclosure.

A catholyte mixture may include at least one salt that provides the one or more cations shown in the redox reactions illustrated in FIGS. 1 and 2, as well as the redox half-reactions that occur in the anolyte mixture in the complimentary half-cell of a flow battery (refer to FIG. 3). Examples of such salts for providing lithium cations include $LiPF_6$, $LiBF_4$, and/or $LiClO_4$. Other salts known to one skilled in the art may be used for providing other cations, for example magnesium cations.

As describe above, the mediator may have a redox potential, $E^0_m$, that is more positive than the redox potential, $E^0_a$, of an active cathode material. Table 1 below summarizes redox potentials for some materials covered within the scope of the present disclosure. Table 1 illustrates that many different mediator/active cathode material combinations exist where $E^0_m$ is greater than $E^0_a$.

TABLE 1

Redox Potentials

| mediator | | active material | |
| --- | --- | --- | --- |
| name | $E^0m$ [V] | name | $E^0a$ [V] |
| TEMPO | >3.4 | $LiFePO_4$ | 3.2 |
| TEMPOL | >3.4 | $LiCoO2$ | 3.8 |
| PTMA | 3.4 | $LiFe_{0.5}Mn_{0.5}PO_4$ | 3.4 |
| PNNS | 3.7 | $LiMn_2O_4$ | 4.1 |
| PNNS-c | 3.58 | | |
| DBBB | 4.1 | | |

FIG. 3 illustrates an exemplary energy storage system 300, according to embodiments of the present disclosure. The energy storage system 300 includes an electrochemical cell 325, which is divided into a first half-cell 335 and a second half-cell 340 by a separator 330. The cathode half-reactions illustrated in FIGS. 1 and 2, and described above, occur in the first half-cell 335. Corresponding anode half-reactions occur in the second half-cell 340. The catholyte mixture 310 is stored in a catholyte reservoir 305 and is circulated through the first half-cell 335 as needed by a catholyte pump 360. Thus, during charging, the catholyte pump 360 moves the low energy, reduced catholyte mixture 310 from the catholyte reservoir 305, through a first catholyte supply line 365 and a second catholyte supply line 370 into and/or through the first half-cell 335. An appropriate voltage applied to the electrochemical cell 325, causes the oxidation of the mediator and active cathode material contained within the catholyte mixture, as described above and illustrated in FIG. 1, resulting in the conversion of the low energy catholyte mixture to the higher energy, oxidized form of the catholyte mixture. The high energy catholyte mixture is then returned to the catholyte reservoir 305 through a catholyte return line 375, for storage until discharge of the battery. During discharge, the catholyte mixture 310 follows the same path through the first half-cell 335 as during charging (alternatively, the direction of flow could be reversed). The difference is that during discharge a load is applied to the electrochemical cell 325, resulting in the reduction of the active cathode material and the mediator contained within the catholyte mixture, as illustrated in FIG. 2.

The second half-cell 340 is configured in a fashion similar to the first half-cell 335. An anolyte mixture 320 is stored in an anolyte reservoir 315 until charging or discharging is needed. For both charging and discharging of the anolyte mixture 320, an anolyte pump 380 circulates the anolyte mixture from the anolyte reservoir 315 through a first anolyte supply line 385 and a second anolyte supply line 390 into and/or through the second half-cell 340 to be charged or discharged. The charging and discharging of the anolyte mixture 320 in the second half-cell 340 are defined by the half-reactions of the components making up the anolyte mixture 320. For example, elemental lithium may be used as the active anode material in an anolyte mixture, whose half-reaction is defined by,

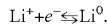

After charging or discharging the anolyte mixture 320 within the second half-cell 340, the anolyte mixture 320 may be returned to the anolyte reservoir 315 for storage until the next charging or discharging cycle is needed. In some embodiments the following reaction may provide the active anode material for an anolyte mixture:

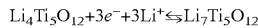

As described above, a catholyte mixture 310 may contain a liquid mediator substantially dissolved within a solvent, and an active species in the form of solid particles. Thus, a catholyte mixture 310 may be stored in the catholyte reservoir 305, and circulated through the first half-cell 335, in the form of a liquid slurry. In such a scenario, the oxidation and reduction reactions of the mediator may occur mostly within the first half-cell 335, while the oxidation and reduction reactions of the solid active cathode material may occur anywhere within the catholyte loop; e.g. the redox reactions of the active cathode material (as shown in FIGS. 1 and 2) may occur within the first half-cell 335, within the catholyte reservoir 305, and/or within any of the loop's piping (the first catholyte supply line 365, second catholyte supply line 370, and/or the catholyte return line 375.)

Figure 4:
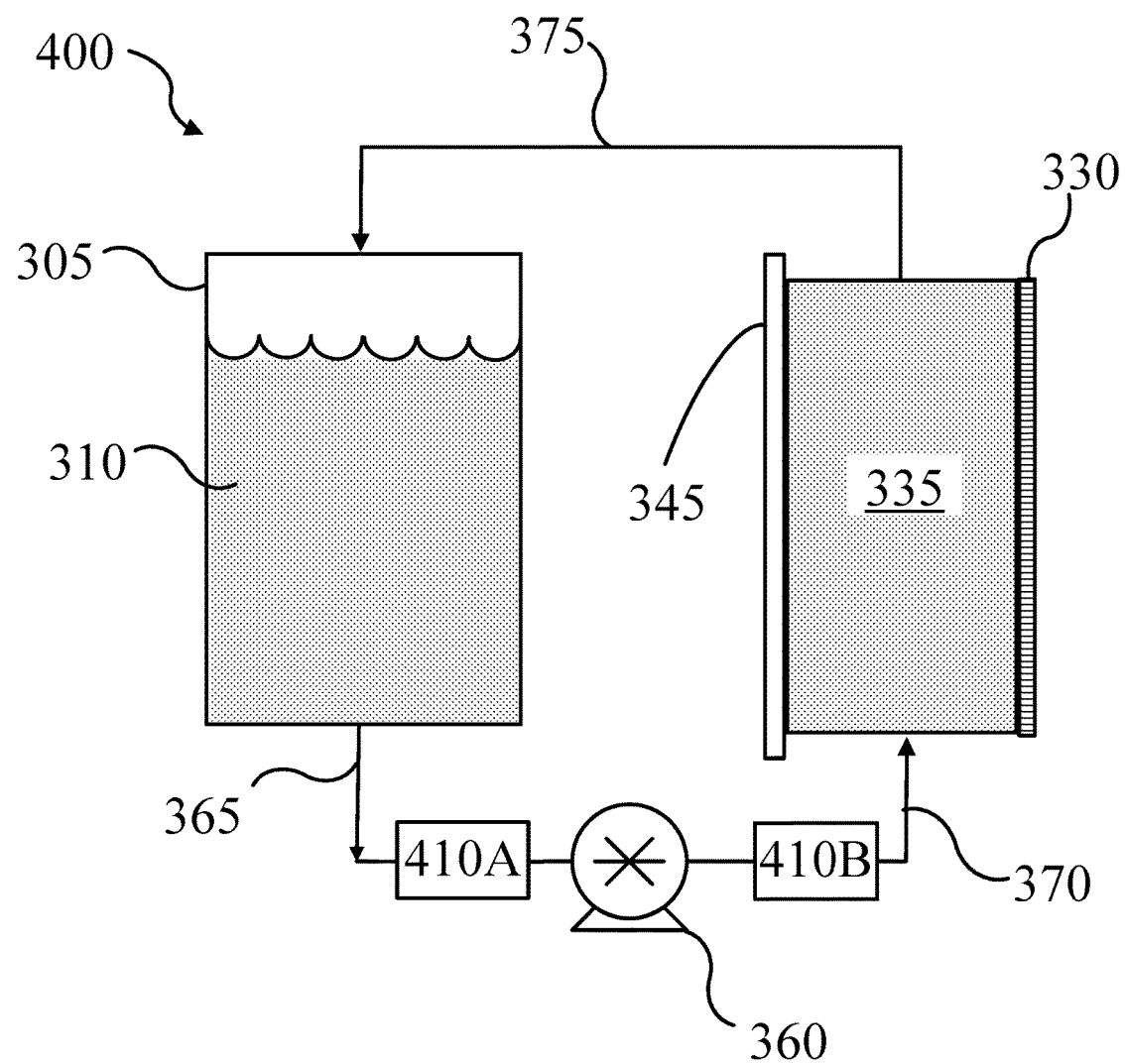
FIG. 4 illustrates a system that substantially segregates the active cathode material from the mediator (solution-based catholyte) in a separate reactor, according to some embodiments of the present disclosure.

Referring to FIG. 4, in some embodiments of the present disclosure, a catholyte loop 400 may include at least one reactor 410 containing the active cathode material in a solid phase, where the reactor 410 is positioned outside of the first half-cell and/or reservoir. Two possible reaction positions are shown in FIG. 4, although other locations fall within the scope of the present disclosure. First, a reactor may be positioned between the catholyte reservoir 305 and the catholyte pump 360, represented by reactor 410A. Second, a reactor may be positioned between the catholyte pump 360 and the first half-cell 335, as represented by reactor 410B. In either configuration, Reaction 1) of FIG. 1 and Reaction 2) of FIG. 2 of the mediator may occur substantially within the first half-cell 235, while Reaction 2) of FIG. 1 and Reaction 1) of FIG. 2 may occur substantially within at least one of the reactors, 410A and/or 410B. The reactor (410A or 410B) may be a fixed bed reactor with active cathode material positioned within the fixed bed reactor. Alternatively, the reactor (410A or 410B) may be continuous stirred-tank reactor, or the active cathode material may be a non-suspended active cathode material in a reservoir. Although FIG. 4 illustrates two reactors (410A and 410B), one or more reactors containing the active cathode material may be positioned in any desirable location within the catholyte loop 400. By containing the active cathode material in reactors (e.g. 410A and 410B), movement of the active particles may be minimized or eliminated, which thus may minimize physical degradation of the solid active cathode material particles. Containing the active cathode material in reactors separate from the electrochemical cell may also result in manufacturing benefits such as easier control of the amount of active cathode material relative to the catholyte, easier charging of the active cathode material to the system, easier maintenance and replacement of the active cathode material from the system, and easier scale-up from small systems to larger industrial-scale systems. Thus, by utilizing at least some of the feature described herein, some embodiments of the present disclosure may provide an energy storage system having a specific power between 160 W/kg and 320 W/kg for a corresponding specific energy between 60 Wh/kg and 160 Wh/kg.

Figure 5:
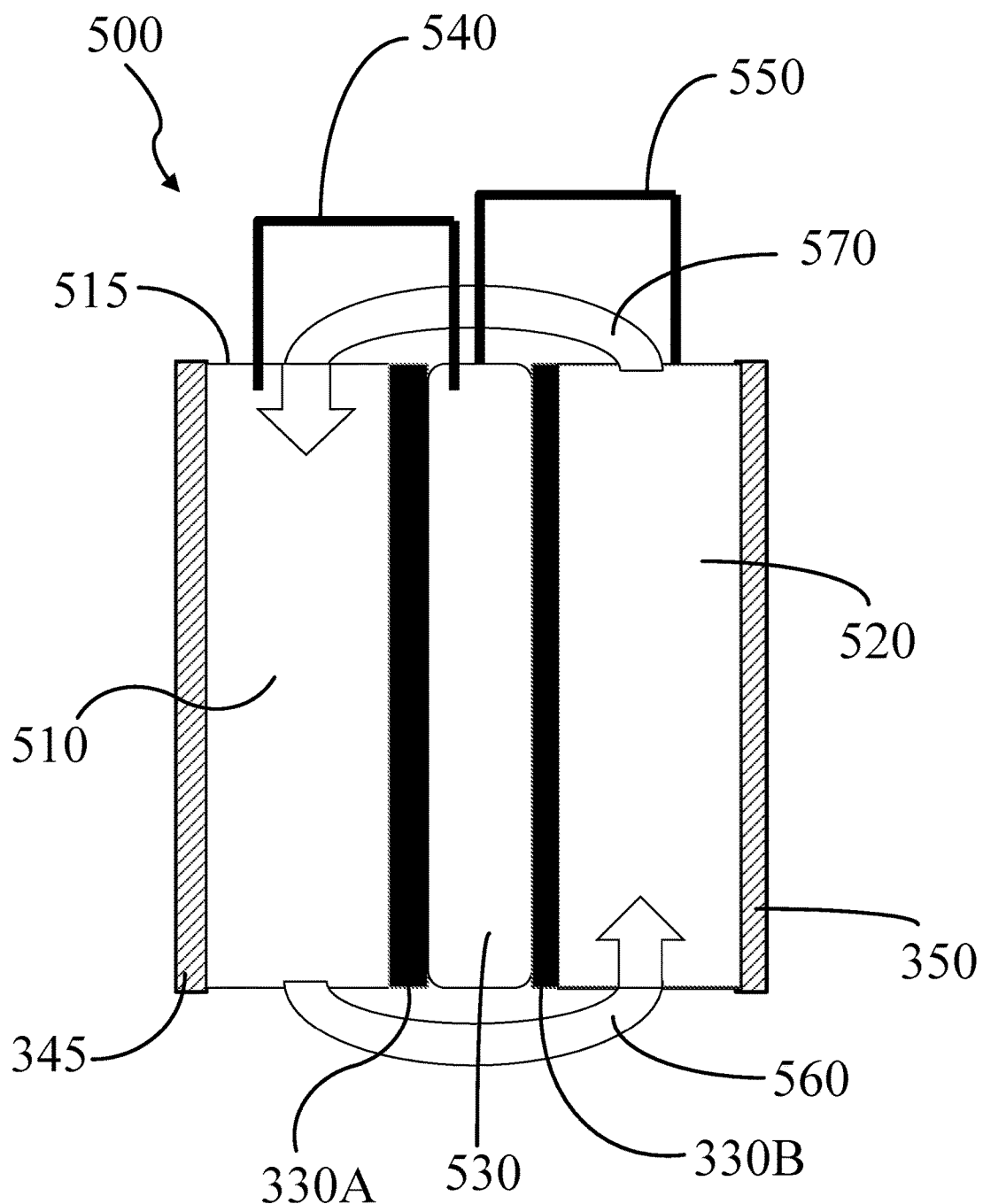
FIG. 5 illustrates an energy storage system, according to some embodiments of the present disclosure.

FIG. 5 illustrates another example of an energy storage system 500, as described above. In this example, a liquid mediator 510, as described above, is stored in a mediator reservoir 515. The liquid mediator 510 may be charged using a charge circuit 540, while the liquid mediator 510 resides in the mediator reservoir 515, resulting in the oxidation of the liquid mediator 510 as shown in Reaction 1) of FIG. 1. The higher energy, oxidized form of the liquid mediator 510 may then pass/flow over and/or through a solid active cathode material 520, for example lithium iron phosphate. The liquid mediator 510 may be directed to the solid active cathode material 520 by a supply line 560, such that after contacting the solid active cathode material 520, the liquid mediator 510 may be recycled to the mediator reservoir 515 by a return line 570. Once the solid active cathode material 520 is sufficiently charged, the solid active cathode material 520 is discharged using a discharge circuit 550. The anode 530 in this example may be any suitable anolyte/anode material, for example lithium metal and/or lithium-carbon and/or other anode materials with appropriate redox potentials. In the example of FIG. 5, a first separator 330A and a second separator 330B may be used to limit crossover of the solid active cathode material 520, which can short-circuit the energy storage system 500, where any ion-conductive membrane may be used as the separator (330A and/or 330B).

A system similar to that illustrate in FIG. 5 and described above was constructed and tested using TEMPO and PTMA as a liquid mediator 510 and lithium iron phosphate as a solid active cathode material 520. Thus, in this example, lithium ions were reversibly intercalated within the iron phosphate active cathode material. The solvent in this case was either propylene carbonate or a 50:50 mixture of ethyl and dimethyl carbonate electrolytes which contained 1M of the salt LiPF$_6$. The anode 530 was constructed of lithium metal. The active cathode material (LFP) was shown first to be oxidized by immersion for less than one minute in the oxidized mediator solution. The LFP was also oxidized by flowing the energized mediator solution over the surface of the LFP solid active cathode material. In this case, two thicknesses of active cathode material were investigated. It was determined that the oxidation of the LFP would be limited by diffusion of the mediator if the active cathode material was "too" thick. Thus, in some embodiments of the present disclosure, an energy storage system may include a solid active cathode material having micro-channels and/or an optimized thickness to minimize such mass-transfer limitations.

Figure 6:
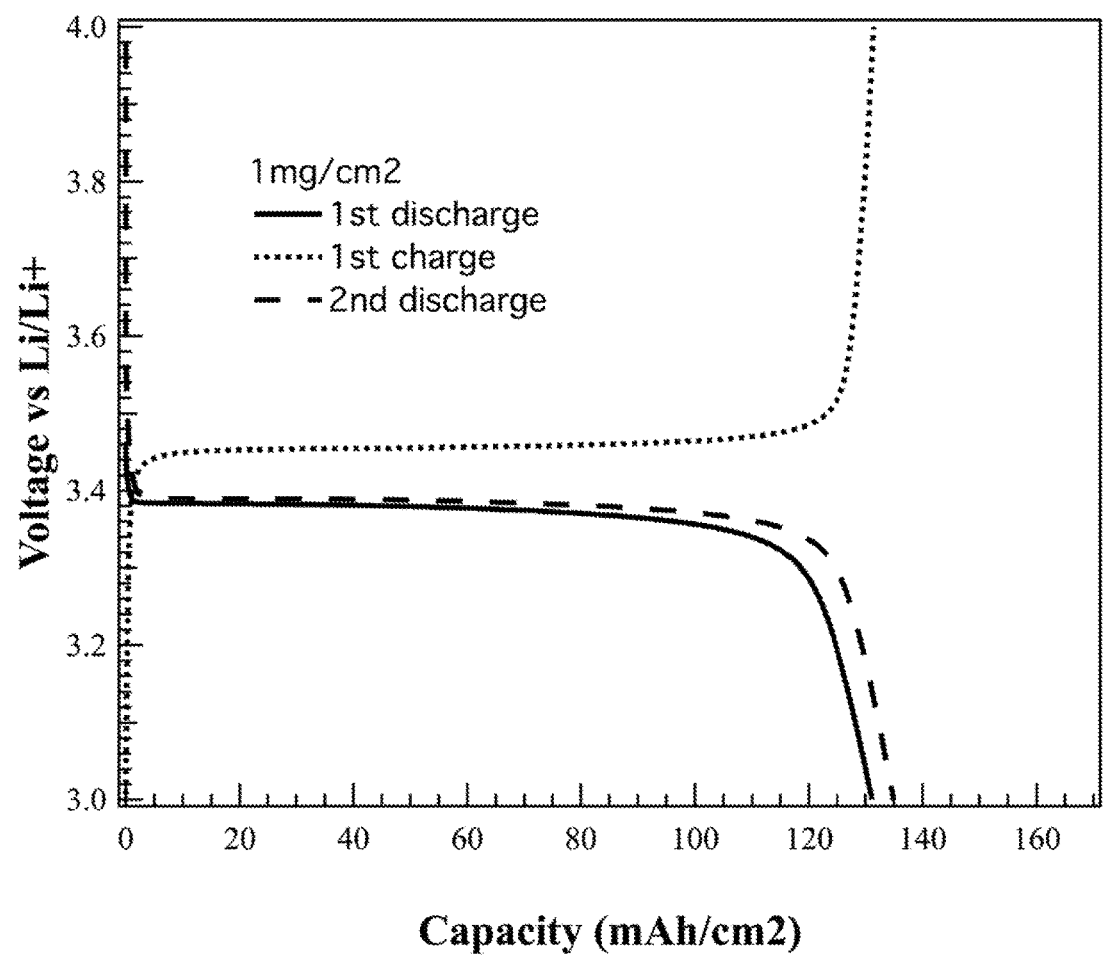
FIG. 6 illustrates experimental data collected from an energy storage system, according to some embodiments of the present disclosure.
Figure 7:
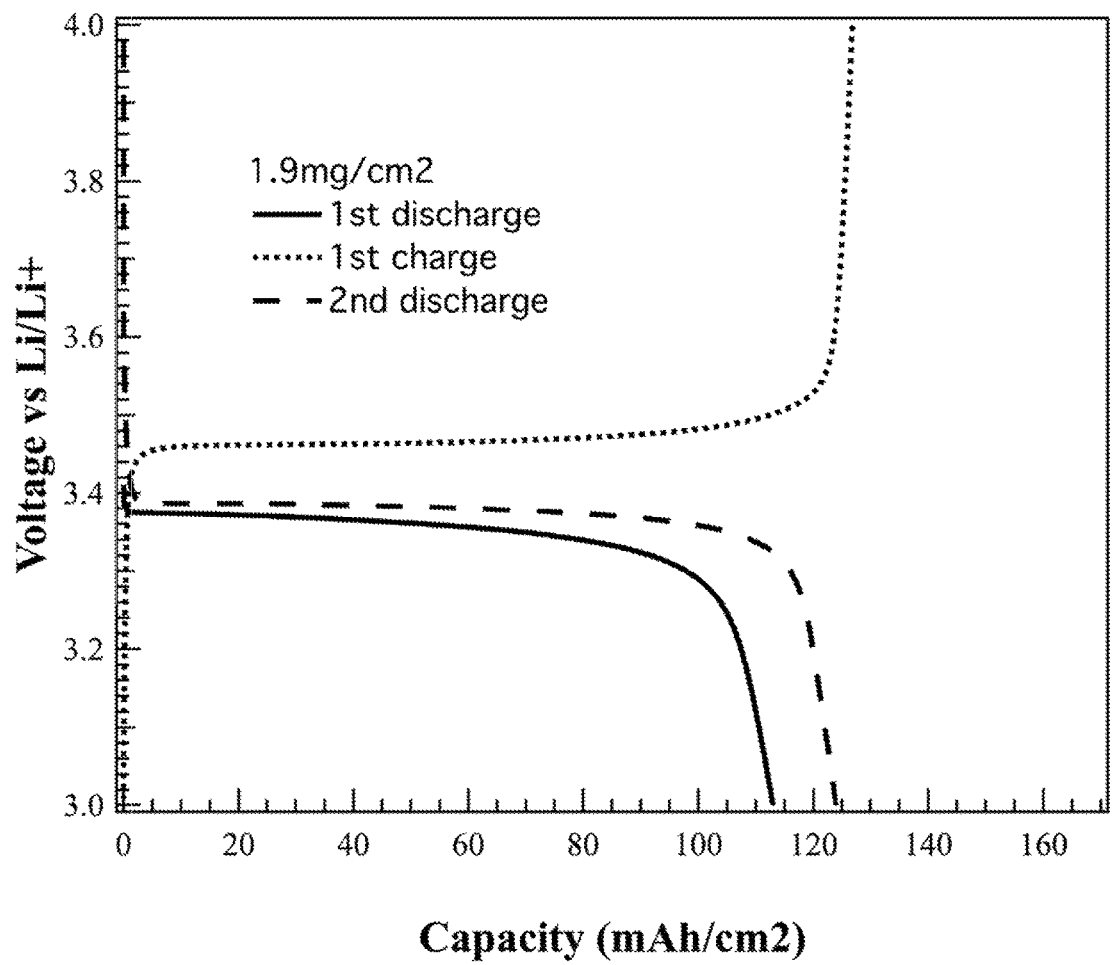
FIG. 7 illustrates experimental data collected from an energy storage system, according to some embodiments of the present disclosure.
Figure 8:
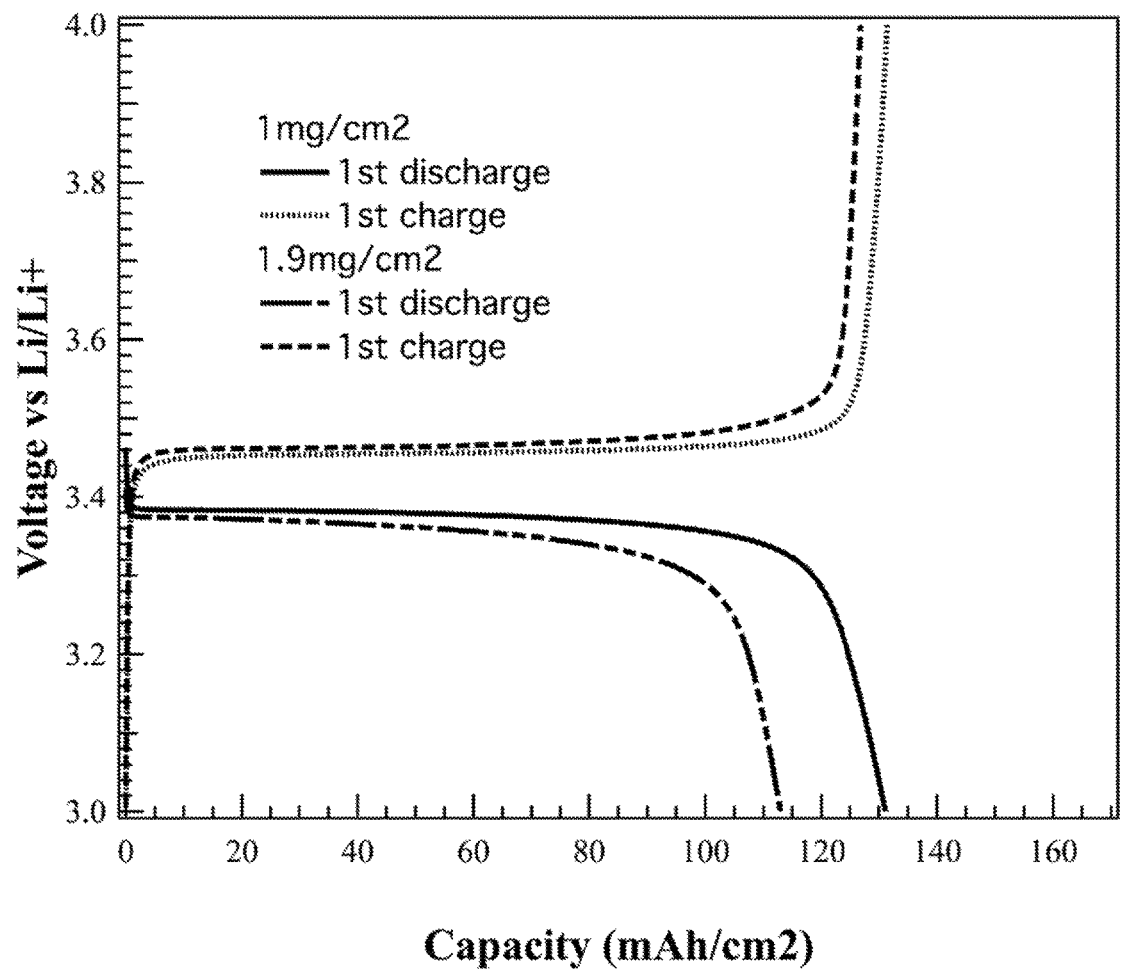
FIG. 8 illustrates compares the experimental data illustrated in FIGS. 6 and 7.

FIGS. 6-8 illustrate experimental results collected from a system similar to that shown in FIG. 5 and described above.

As described above for FIG. 5, a solid active cathode material of lithium iron phosphate (LFP) was used, which was oxidized by a mediator of liquid TEMPO having a 50 millimolar concentration within a carbonate 1M LiPF6 electrolyte solution. Cycling of the mediator solution across the solid surfaces of the solid active cathode material (LFP) resulted in the charging, e.g. oxidation of the solid state LFP active cathode material. The rate of the LFP oxidation was effectively charged at a temperature of about 40° C.; e.g. the solid active cathode material was fully charged in about 1.5 minutes. In typical cases this would cause detrimental effects on the battery, reducing its performance because of the rapid charging of the material. However, as can be seen in FIG. 6, the discharge of both materials (of the varying thickness cathode) after liquid catholyte charging were within 10% of theoretical values. FIGS. 7 and 8 show the recharge cycles for the same system after the initial flow charge of the LFP cathode. In this system, because the cathode was a flat surface, the thickness (mass) of the sample was not optimized to maximize the charging rate. So, in this particular case, the 1 mg/cm$^2$ sample showed the ability to achieve 98% theoretical charging capacity of the cathode in 1.5 minutes, while the thicker cathode was slightly slower and only charged to 90% of its capacity. For this example of a solution phase mediator and solid active cathode material, the following approximate limits were identified:

1) An effective charge rate at a charging temperature between about 30° C. and about 40° C. Therefore, in this particular case, the redox mediator oxidation of the active cathode material will not limit the charge rate.

2) It is important to identify that the high charging rate capability of the organic liquid catholyte mediator, and the high charging rate conversion of the cathode material (LFP) to the energized state enables the use of reduced concentrations of the mediator and volume of the nonaqueous solvent, which in turn, enables a reduced solution impedance enhanced charge/discharge rates. This has the effect of reducing cost and environmental impact.

3) Finally, in this construct of mediator/cathode material, one cannot overcharge the cathode in the chemical oxidation of the LFP. This overvoltage effect for fast charging rates in a typical battery cell has irreversible deleterious effects on the LFP material, leading to catastrophic failure of the battery. These overvoltage losses typically seen with many of the metal-oxide cathodes cathodes cannot occur in the systems described herein. Therefore, according to some embodiments of the present disclosure the active cathode material may discharge at continuous high rates at temperatures greater than 10° C., with excellent life-cycles, which may be extended even further by utilizing the mediator/active cathode material systems described herein.

In some embodiments of the present disclosure, two energy storage systems (e.g. flow batteries) as described above and illustrated in FIG. 3 may be combined such that one of the energy storage systems contained within a vehicle may be easily and quickly recharged, and the second energy storage system is external to the vehicle and provides the charged materials needed to power the vehicle. For example, such a two-flow battery system may include a primary energy storage system (flow battery) positioned within the vehicle such that the first primary energy storage system only provides an energy source for discharging (e.g. to propel the vehicle), and a secondary energy storage system provided externally to the vehicle, for example at a charging station, that only provides a charging capacity. In such a system, current will flow in only one direction between the anode and the cathode in the primary energy storage system and/or the secondary energy storage system. Current that is restricted to flow in only one direction (e.g. for discharging or charging), among other things, provides the benefit of preventing the formation of coatings or layers (e.g. of dendrites) and the battery active materials, which may block the desired transfer of cations (e.g. Li$^+$ and/or Mg$^{2+}$) to and/or from the anode and/or cathode active materials.

Thus, according to some embodiments of the present disclosure, a solid active cathode material for the flow battery located on the vehicle may be recharged using a cathode mixture containing an oxidized mediator as described previously. This "charged" cathode mixture may be formed by the external secondary "charging station" battery, which may also produce the "charged" form of an anode mixture. According to some embodiments of the present disclosure, the anode mixture produced by the secondary "charging station" battery may include a mixture of a soluble active anode material within an electrolyte solution. In some cases, the anode mixture produced by a secondary "charging station" battery may include a mixture of a solid active anode material within an electrolyte solution, such that the anode mixture is in the form of slurry. Thus, the solid active anode material may be provided in particulate form to facilitate easier transfer of the anode mixture from the first flow battery to the second flow battery, and to minimize mass-transfer limitation of the ions being transferred into and out of the solid active anode material.

In other words, a vehicle charging system may include a first flow battery that is positioned within the vehicle and a second flow battery positioned external to the vehicle. The first flow battery system may only operate in discharge mode (see FIG. 2) and the second flow battery system may only operate in charging mode (see FIG. 1). Thus, the first flow battery may only discharge a cathode mixture and an anode mixture, whereas the second flow battery may only charge the cathode mixture and the anode mixture. Thus, both flow batteries may include storage containers, one each for the charged cathode mixture, discharged cathode mixture, charged anode mixture, and discharged anode mixture. When the first flow battery of the vehicle has spent all of a previous charge, its discharged cathode container and its discharged anode container will contain the discharged cathode mixture and the discharged anode mixture, respectively, and the charged cathode container and the charged anode container will be empty, the charged cathode mixture and charged anode mixture having been consumed. At that point, the user may transfer the discharged cathode mixture from the first flow battery to the discharged cathode container of the second flow battery ("charging station"), as well as transfer the discharged anode mixture from the first flow battery to the discharged anode container of the second flow battery. Similarly, the user may transfer a fresh bolus of charged cathode mixture from the storage container of the second flow battery to the charged cathode container of the first flow battery ("vehicle"), as well as transfer the charged anode mixture from the second flow battery to the charged anode container of the first flow battery. At that point, the first flow battery of the vehicle will have a new charge of stored energy and the vehicle may resume travel, and the second flow battery may proceed with re-charging the received discharged cathode mixture and/or anode mixture, as described above.

In some embodiments of the present disclosure, such a two flow battery system may utilize a cathode mixture as described above and illustrated in FIGS. 1-4. For example, the cathode mixture may include at least one of an active cathode material, a mediator, and/or an electrolyte. In some embodiments of the present disclosure, the cathode mixture may include an active cathode material, a mediator, an electrolyte, and at least one additive. In some embodiments, the cathode mixture may only contain an electrolyte (e.g. solvent containing ions) and the mediator. In some embodiments of the present disclosure, the active cathode material of the vehicle's flow battery may be provided as a solid that remains in the vehicle (e.g. it is not replaced), such that the cathode mixture only includes an electrolyte and the mediator. Once the charged mediator, contained within the cathode mixture and provided by the second blow-battery, is provided to the first flow-battery and is contacted with the solid active cathode material, the transfer of charge and/or energy from the mediator to the solid active cathode material will occur quickly.

In some embodiments of the present disclosure, the anode mixture of the first flow battery may be the same as the anode mixture of the second flow battery, or the two systems may be different. At a minimum the anode mixture of the second flow battery requires a redox potential (voltage) capable of charging the cathode mixture of the first flow battery cathode. Nor does this second flow battery need to cycle quickly. For a first flow battery utilizing a solid active cathode material placed on the vehicle, as long as the cathode mixture containers and/or anode mixture containers are sufficiently large, the solid active cathode material of the vehicle's flow battery may be charged as fast as required for a specific application. This is because the charged cathode solution (e.g. electrolyte plus mediator) may be cycled over/through the solid active cathode material resulting in the essentially instantaneous transfer of energy/charge from the mediator to the solid active cathode material due to respective redox potentials of the mediator and the solid active cathode material. In addition, and cathode mixture (e.g. electrolyte plus mediator) may be recharged when it is convenient, such as from the grid during off-peak hours or during high wind or solar power production in the second flow battery (charging station). In addition, the cathode mixture (e.g. electrolyte plus mediator) may be charged at the optimal charging for the second flow battery.

EXAMPLES

Example 1

A mixture comprising: a mediator having a first redox potential; a non-liquid active material having a second redox potential that is less than the first redox potential; and a cation, wherein: the non-liquid active material has a first condition comprising a first oxidation state, where the cation is intercalated within the non-liquid active material, the non-liquid active material has a second condition comprising a second oxidation state that is higher than the first oxidation state, where the non-liquid active material is substantially free of the cation, the mediator has a first condition comprising a third oxidation state and a second condition comprising a fourth oxidation state that is higher than the third oxidation state, the non-liquid active material is capable of being reversibly cycled between its first condition and its second condition, and the mediator is capable of being reversibly cycled between its first condition and its second condition.

Example 2

The mixture of Example 1, wherein the mediator comprises an organic radical group.

Example 3

The mixture of Example 2, wherein the organic radical group comprises a nitroxide group.

Example 4

The mixture of Example 1, wherein the mediator has a molecular weight less than about 10,000 g/mol.

Example 5

The mixture of Example 1, wherein the mediator comprises at least one of (2,2,6,6-tetramethylpiperidin-1-yl) oxyl, (1-oxyl-2,2,6,6-tetramethyl-4-hydroxypiperidine), a nitronyl nitroxide, a azephenylenyl, a percholorophenylmethyl radical, tris(2,4,6-trichlorophenyl)methyl radical, poly (2,2,6,6-tetramethylpiperidinyloxy-4-yl methacrylate), or poly[4-(nitronylnitroxyl)styrene].

Example 6

The mixture of Example 3, wherein, when in the first condition of the mediator, the mediator comprises

and when in the second condition of the mediator, the mediator comprises

Example 7

The mixture of Example 3, wherein the mediator includes a structure comprising at least one of

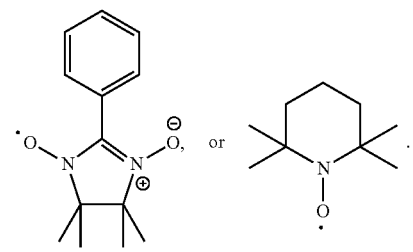

Example 8

The mixture of Example 1, wherein the mediator includes

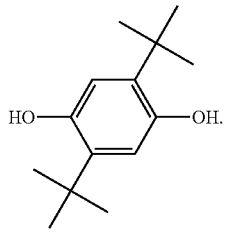

Example 9

The mixture of Example 1, wherein the non-liquid active material comprises at least one of a solid or a gel.

Example 10

The mixture of Example 9, wherein the non-liquid active material comprises a solid particulate.

Example 11

The mixture of Example 10, wherein the solid particulate has a particle between 1 nanometer and 1000 micrometers.

Example 12

The mixture of Example 1, wherein the non-liquid active material comprises at least one of cobalt, nickel, manganese, aluminum, titanium, vanadium, or iron.

Example 13

The mixture of Example 12, wherein the non-liquid active material comprises at least one of an oxide or a phosphate.

Example 14

The mixture of Example 13, wherein the non-liquid active material comprises at least one of a cobalt oxide, a nickel cobalt oxide, a manganese cobalt oxide, or an iron phosphate.

Example 15

The mixture of Example 13, wherein the non-liquid active material comprises at least one of $CoO_2$, $FePO_4$, or $Fe_{0.5}Mn_{0.5}PO_4$.

Example 16

The mixture of Example 1, wherein the cation comprises at least one of a Group 1, a Group 2, or a Group 13 element.

Example 17

The mixture of Example 1, wherein the cation comprises at least one of lithium, magnesium, aluminum, or beryllium.

Example 18

The mixture of Example 17, wherein the cation comprises lithium.

Example 19

The mixture of Example 1, further comprising a salt, wherein the salt provides at least a portion of the cation.

Example 20

The mixture of Example 19, wherein the salt comprises at least one of $LiPF_6$, $LiBF_4$, or $LiClO_4$.

Example 21

The mixture of Example 19, further comprising a solvent, wherein the mediator and the salt are substantially soluble in the solvent.

Example 22

The mixture of Example 21, wherein the solvent comprises at least one aprotic solvent.

Example 23

The mixture of Example 22, wherein the aprotic solvent comprises at least one of a carbonate, an ether, an acetate, or a ketone

Example 24

The mixture of Example 22, wherein the aprotic solvent comprises at least one of tetrahydrofuran, ethyl acetate, acetone, dimethylformamide, acetonitrile, dimethyl sulfoxide, or propylene carbonate.

Example 25

The mixture of Example 21, wherein the solvent comprises at least one protic solvent.

Example 26

The mixture of Example 25, wherein the protic solvent comprises at least one of water, an alcohol, or glycerin.

Example 27

The mixture of Example 21, wherein the mixture has an energy storage density greater than or equal to 300 Wh/L, when the non-liquid active material is in its second condition, and the mediator is in its second condition.

Example 28

The mixture of Example 1, wherein the cation comprises lithium and the first redox potential is greater than 2.8 V.

Example 29

The mixture of Example 1, wherein the cation comprises magnesium and the first redox potential is greater than 1.0 V.

Example 30

The mixture of Example 1, wherein the cation comprises aluminum and the first redox potential is greater than 2.0 V.

Example 31

The mixture of Example 1, wherein the cation comprises berrylium and the first redox potential is greater than 1.3 V.

Example 32

A method comprising transferring energy to a mixture by applying a voltage to the mixture, wherein: the mixture comprises a mediator, an active material, and a salt mixed within a solvent, the voltage transforms the mediator from a neutral condition to an oxidized condition, and the mediator in the oxidized condition oxidizes the active material, thereby transforming the active material from a low energy condition to a high energy condition, and regenerating the mediator to its neutral condition.

Example 33

The method of Example 32, further comprising applying a load to the mixture, wherein the load transforms the active material from its high energy condition to its low energy condition.

Example 34

A system comprising: a first flow battery positioned on a vehicle; and a second flow battery positioned external of the vehicle, wherein: the first flow battery is only operated in a charging mode, and the second flow battery is only operated in a discharging mode.

Example 35

The system of Example 34, wherein the first flow battery comprises a solid active cathode material.

Example 36

The system of Example 34, wherein the first flow battery and the second flow battery exchange a cathode mixture comprising an electrolyte and a mediator.

Example 37

The system of Example 34, wherein the first flow battery and the second flow battery exchange an anode mixture comprising an electrolyte and a solid active anode material such that the anode mixture is a slurry.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A catholyte mixture comprising:
a mediator having a first redox potential;
an cathode material having a second redox potential that is less than the first redox potential; and
a cation, wherein:
the cathode material is in a form comprising a solid particulate,
the cathode material has a first condition comprising a first oxidation state, where the cation is intercalated within the cathode material,
the cathode material has a second condition comprising a second oxidation state that is higher than the first oxidation state, where the cathode material is substantially free of the cation,
the mediator has a first condition comprising a third oxidation state and a second condition comprising a fourth oxidation state that is higher than the third oxidation state,
the cathode material is capable of being reversibly cycled between the first condition of the cathode material and the second condition of the cathode material, and
the mediator is capable of being reversibly cycled between its first condition and its second condition.

2. The catholyte mixture of claim 1, wherein the mediator comprises an organic radical group.

3. The catholyte mixture of claim 2, wherein the organic radical group comprises a nitroxide group.

4. The catholyte mixture of claim 1, wherein the mediator has a molecular weight less than 10,000 g/mol.

5. The catholyte mixture of claim 1, wherein the mediator comprises at least one of (2,2,6,6-tetramethylpiperidin-1-yl) oxyl, (1-oxyl-2,2,6,6-tetramethyl-4-hydroxypiperidine), a nitronyl nitroxide, a azephenylenyl, a percholorophenylmethyl radical, tris(2,4,6-trichlorophenyl)methyl radical, poly (2,2,6,6-tetramethylpiperidinyloxy-4-yl methacrylate), or poly[4-(nitronylnitroxyl)styrene].

6. The catholyte mixture of claim 3, wherein, when in the first condition of the mediator, the mediator comprises

and when in the second condition of the mediator, the mediator comprises

7. The catholyte mixture of claim 3, wherein the mediator includes a structure comprising at least one of

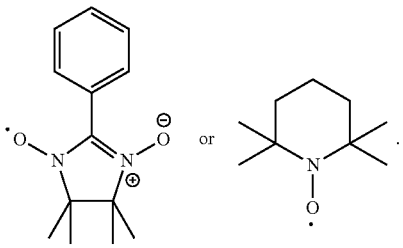

8. The catholyte mixture of claim 1, wherein the cathode material further comprises a gel.

9. The catholyte mixture of claim 1, wherein the solid particulate has a particle size between 1 nanometer and 1000 micrometers.

10. The catholyte mixture of claim 1, wherein the cathode material comprises at least one of cobalt, nickel, manganese, aluminum, titanium, vanadium, or iron.

11. The catholyte mixture of claim 10, wherein the cathode material further comprises at least one of an oxide or a phosphate.

12. The catholyte mixture of claim 11, wherein the cathode material comprises at least one of a cobalt oxide, a nickel cobalt oxide, a manganese cobalt oxide, or an iron phosphate.

13. The catholyte mixture of claim 11, wherein the cathode material comprises at least one of $CoO_2$, $FePO_4$, or $Fe_{0.5}Mn_{0.5}PO_4$.

14. The catholyte mixture of claim 1, wherein the cation comprises at least one of a Group 1 element, a Group 2 element, or a Group 13 element.

15. The catholyte mixture of claim 1, wherein the cation comprises at least one of lithium, magnesium, aluminum, or beryllium.

16. The catholyte mixture of claim 1, further comprising a salt, wherein the salt provides at least a portion of the cation.

17. The catholyte mixture of claim 16, wherein the salt comprises at least one of $LiPF_6$, $LiBF_4$, or $LiClO_4$.

18. The catholyte mixture of claim 16, further comprising a solvent, wherein the mediator and the salt are substantially soluble in the solvent.

19. The catholyte mixture of claim 18, wherein the mixture has an energy storage density greater than or equal to 300 Wh/L, when the cathode material is in the second condition of the cathode material, and the mediator is in the second condition of the mediator.

20. A method comprising transferring energy to a catholyte mixture by applying a voltage to the catholyte mixture, wherein:
the catholyte mixture comprises a mediator having a first redox potential, an cathode material having a second redox potential that is less than the first redox potential, a cation, and a solvent,
the cathode material is in a form comprising a solid particulate,
the voltage transforms the mediator from a first condition having a first oxidation state to a second condition having a second oxidation state that is higher than the first oxidation state, and
when in the second condition, the mediator oxidizes the cathode material, thereby transforming the cathode material from a first condition comprising a third oxidation state where the cation is intercalated within the cathode material, to a second condition comprising a fourth oxidation state that is higher than the third oxidation state where the cathode material is substantially free of the cation,
the cathode material is capable of being reversibly cycled between the first condition of the cathode material and the second condition of the cathode material, and
the mediator is capable of being reversibly cycled between the first condition of the mediator and the second condition of the mediator.

21. The method of claim 20, further comprising applying a load to the catholyte mixture, wherein the load transforms the cathode material from the second condition of the cathode material to the first condition of the cathode material.

* * * * *